(12) United States Patent
Chen (10) Patent No.: US 8,855,621 B2
(45) Date of Patent: Oct. 7, 2014

(54) CELLPHONE CONTROLLABLE CAR INTRUSION RECORDING AND MONITORING REACTION SYSTEM

(71) Applicant: Innova Electronics, Inc., Irvine, CA (US)

(72) Inventor: Ieon Chen, Laguna Hills, CA (US)

(73) Assignee: Innova Electronics, Inc., Irvine, CA (US)

( * ) Notice: Subject to any disclaimer, the term of this patent is extended or adjusted under 35 U.S.C. 154(b) by 36 days.

(21) Appl. No.: 13/688,641

(22) Filed: Nov. 29, 2012

(65) Prior Publication Data

US 2013/0295912 A1 Nov. 7, 2013

Related U.S. Application Data

(63) Continuation-in-part of application No. 13/461,124, filed on May 1, 2012.

(51) Int. Cl.
| | | |
|---|---|---|
| *H04M 3/00* | (2006.01) | |
| *H04M 1/00* | (2006.01) | |
| *H04W 4/04* | (2009.01) | |
| *H04N 5/77* | (2006.01) | |
| *B60R 25/00* | (2013.01) | |
| *H04W 4/00* | (2009.01) | |
| *H04W 12/12* | (2009.01) | |
| *H04L 29/08* | (2006.01) | |

(52) U.S. Cl.
CPC ............... *H04W 4/00* (2013.01); *H04W 12/12* (2013.01); *H04M 1/00* (2013.01); *H04L 67/12* (2013.01); *H04W 4/046* (2013.01); *H04N 5/77* (2013.01); *B60R 25/00* (2013.01)

USPC ................ 455/420; 455/414.1; 455/412.1; 455/418; 455/419

(58) Field of Classification Search
CPC ....... H04W 12/12; H04W 4/00; H04W 4/046; H04M 1/00; H04L 67/12; H04N 5/77; B60R 25/00
USPC .............. 455/420, 414.1, 412.1, 418, 419
See application file for complete search history.

(56) References Cited

U.S. PATENT DOCUMENTS

| D334,560 | S | 4/1993 | Wilson |
|---|---|---|---|
| 5,347,211 | A | 9/1994 | Jakubowski |
| D377,622 | S | 1/1997 | Chen |
| 5,635,841 | A | 6/1997 | Taylor |
| 5,767,681 | A | 6/1998 | Huang |
| 6,000,413 | A | 12/1999 | Chen |

(Continued)

*Primary Examiner* — Khai M Nguyen
(74) *Attorney, Agent, or Firm* — Stetina Brunda Garred & Brucker (57) ABSTRACT

A cellphone controllable car intrusion system is provided. This system includes a vehicle OEM system, including an electronic control unit (ECU), a diagnostic port, a plurality of OEM cameras, a plurality of OEM sensors, an OEM satellite communication system, and an OEM local communication system. The diagnostic port, OEM cameras, OEM sensors, OEM satellite communication system, and the OEM local communication system being in electric communication with the ECU. A cellphone is provided having a local communication system disposed therein. The cellphone is in wireless communication with the ECU. The cellphone is adapted to configure the ECU to enable operation of the OEM cameras in response to receipt by the cellphone of an alert signal from the OEM sensors, indicating that an intrusion is in process. The alert signals are representative of detection of a monitor event by one or more of the OEM sensors.

12 Claims, 3 Drawing Sheets

(56) References Cited

U.S. PATENT DOCUMENTS

| | | |
|---|---|---|
| 6,362,730 B2 | 3/2002 | Razavi et al. |
| 6,499,385 B2 | 12/2002 | Protti |
| 6,868,369 B2 | 3/2005 | Huang |
| 6,940,270 B2 | 9/2005 | Chen |
| D510,287 S | 10/2005 | Chen |
| 6,968,733 B2 | 11/2005 | Andreasen |
| 7,030,742 B2 | 4/2006 | Treadway |
| 7,062,300 B1 | 6/2006 | Kim |
| 7,064,657 B2 * | 6/2006 | Becker et al. .............. 340/426.1 |
| 7,085,680 B2 | 8/2006 | Huang |
| 7,116,216 B2 | 10/2006 | Andreasen |
| 7,117,075 B1 | 10/2006 | Larschan et al. |
| 7,209,813 B2 | 4/2007 | Namaky |
| RE39,619 E | 5/2007 | Andreasen |
| D545,223 S | 6/2007 | Chen |
| D559,137 S | 1/2008 | Protti |
| D560,129 S | 1/2008 | Rich |
| D560,527 S | 1/2008 | Rich |
| 7,325,775 B2 | 2/2008 | Chen |
| D563,249 S | 3/2008 | Chen |
| D569,280 S | 5/2008 | Chen |
| 7,376,497 B2 | 5/2008 | Chen |
| D571,241 S | 6/2008 | Andreasen |
| 7,437,227 B2 | 10/2008 | Andreasen |
| D581,822 S | 12/2008 | Madison |
| 7,464,000 B2 | 12/2008 | Huang |
| D588,621 S | 3/2009 | Baty |
| D590,387 S | 4/2009 | Chen |
| 7,520,668 B2 | 4/2009 | Chen |
| RE40,798 E | 6/2009 | Chen |
| RE40,799 E | 6/2009 | Chen |
| 7,603,293 B2 | 10/2009 | Chen |
| D610,586 S | 2/2010 | Chen |
| 7,734,390 B2 | 6/2010 | Chen |
| D624,446 S | 9/2010 | Chen |
| D624,838 S | 10/2010 | Chen |
| D625,209 S | 10/2010 | Chen |
| D625,210 S | 10/2010 | Chen |
| D625,634 S | 10/2010 | Chen |
| 7,974,750 B2 | 7/2011 | Namaky |
| 8,019,503 B2 | 9/2011 | Andreasen |
| 8,024,083 B2 | 9/2011 | Chen |
| D646,188 S | 10/2011 | Chen |
| D646,599 S | 10/2011 | Chen |
| 8,032,277 B2 | 10/2011 | Larschan et al. |
| 8,032,419 B2 | 10/2011 | Chen |
| 8,055,403 B2 | 11/2011 | Lowrey et al. |
| 8,068,951 B2 | 11/2011 | Chen et al. |
| 8,301,329 B2 | 10/2012 | Andreasen |
| 8,306,687 B2 | 11/2012 | Chen |
| 8,370,018 B2 | 2/2013 | Andreasen et al. |
| 2004/0140885 A1 | 7/2004 | Slicker et al. |
| 2004/0257208 A1 | 12/2004 | Huang et al. |
| 2006/0192659 A1 | 8/2006 | Fazio |
| 2006/0293802 A1* | 12/2006 | Kitao et al. ....................... 701/2 |
| 2007/0027595 A1* | 2/2007 | Nou ............................... 701/36 |
| 2008/0004765 A1 | 1/2008 | Falter et al. |
| 2008/0079554 A1 | 4/2008 | Boice |
| 2008/0119981 A1 | 5/2008 | Chen |
| 2008/0249681 A1 | 10/2008 | Bertosa et al. |
| 2009/0066488 A1* | 3/2009 | Qiahe et al. ................. 340/426.1 |
| 2009/0276115 A1 | 11/2009 | Chen |
| 2010/0194884 A1 | 8/2010 | Plaster |
| 2010/0271509 A1* | 10/2010 | Marumoto et al. ...... 348/231.99 |
| 2011/0106375 A1* | 5/2011 | Gurusamy Sundaram ..... 701/33 |
| 2011/0109450 A1 | 5/2011 | Hirschfeld et al. |
| 2011/0187513 A1* | 8/2011 | Taki et al. ................. 340/13.25 |
| 2011/0195701 A1 | 8/2011 | Cook et al. |
| 2011/0224866 A1 | 9/2011 | Chen |
| 2011/0264322 A1 | 10/2011 | Chen |
| 2012/0001755 A1 | 1/2012 | Conrady |
| 2012/0010775 A1 | 1/2012 | Chen |
| 2012/0172010 A1* | 7/2012 | Oman et al. ................ 455/414.1 |
| 2012/0215398 A1 | 8/2012 | Chen |

* cited by examiner

CELLPHONE CONTROLLABLE CAR INTRUSION RECORDING AND MONITORING REACTION SYSTEM

CROSS-REFERENCE TO RELATED APPLICATIONS

This application is a continuation-in-part of prior U.S. patent application Ser. No. 13/461,124, filed May 1, 2012, the contents of which are expressly incorporated herein by reference.

STATEMENT RE: FEDERALLY SPONSORED RESEARCH/DEVELOPMENT

Not Applicable

BACKGROUND

The present invention relates to a vehicle intrusion system and, more particularly, to an OEM based intrusion system that is reportable to and controllable by a user's cellphone.

Various types of vehicle alarm systems have been used for many years. The original equipment manufacturers (OEM's) market alarm systems that utilize OEM sensor systems, power couplings, switching circuits, and alarms (e.g. horns). Such OEM systems monitor for events, such as door openings and generate an alarm signal when a monitored event occurs while the alarm is on an on state. Where the vehicle includes a satellite communication system, the occurrence of a monitored event may activate the satellite communication system, to advise to remote monitoring station of the intrusion and other information, such as the location of the vehicle. Where the satellite communication system supports bi-directional communication, the remote monitoring station may direct the vehicle electronic control unit (ECU) to take appropriate steps, such as disabling the vehicle at its then current location.

Aftermarket vehicle alarm systems commonly utilize separate sensors, controllers, communication systems, and alarms. Such aftermarket alarm systems are commonly connected to a vehicle power circuit and may also be connected to some of the OEM vehicle sensors, typically at the sensor output.

Aftermarket vehicle alarm systems are not limited to OEM sensors or communication systems, and thereby permit greater flexibility in the functionality of the alarm system. However, the cost of such systems may be substantial and professional installation is frequently required. Moreover, to the extent that such aftermarket alarm systems interface with the vehicle electrical system in a manner unintended by the OEM, the connection of such components may give rise to defects in the vehicle electrical system.

Accordingly, while aftermarket alarm systems allow for considerable flexibility in monitoring, communication, and other functions, it is desirable to utilize the existing resources of the vehicle sensor system, communication system, control system, etc. to implement such additional functionalities as much as possible to avoid unnecessary costs for components, installation, and communication services.

Fortunately, OEM vehicle sensing systems, communication systems, and control systems have evolved considerably during recent years. Vehicle sensors systems have evolved to include functionalities such as collision detectors, door open, truck open, seat sensors, GPS location, pedestrian detectors (infer-red, ultrasonic or millimeter wave radar), rear cameras, side cameras, top cameras, and interior motion detectors.

OEM systems have also become more readily accessible and configurable to implement additional functions. OEM vehicle communication systems include satellite communications circuits, local communication circuits (to interface with Wi-Fi™, or Bluetooth™ network(s)), and cellphone connector ports.

The various OEM sensor systems and communication systems are generally controllable by the ECU, which can be configured to regulate the operation of the various sensors and communication devices to implement functionalities beyond those normally implemented by the various OEM sensors and communication systems.

The present invention recognizes and utilizes the flexibility of existing OEM systems to implement the functionalities offered in aftermarket alarm systems without the need to purchase and install additional sensors, controllers, alarms or communication systems. However, the present invention also allows the use of aftermarket sensors, particularly where the vehicle OEM systems do not support such functionality.

Further, in accordance with the present invention, data recording may be provided as an integral part of the intrusion system, e.g. to obtain images of the perpetrators and their activities. In one embodiment of the present invention OEM vehicle diagnostic data ports and/or OEM communications systems operate to facilitate data recording functions, either locally within the vehicle or remotely, at limited cost and with minimal, if any, installation requirements.

Accordingly, present invention is intended to provide a system and methodology for implementing an OEM based vehicle intrusion system which utilizes existing vehicle OEM sensors, communications systems, and control networks to provide a low cost intrusion detection system, having an enhanced capabilities and ease of use.

BRIEF SUMMARY

A cellphone controllable car intrusion system is provided. In one embodiment the system includes a vehicle OEM system, including an electronic control unit (ECU), a diagnostic port, a plurality of OEM cameras, a plurality of OEM sensors, an OEM satellite communication system, and an OEM local communication system. The diagnostic port, OEM cameras, OEM sensors, OEM satellite communication system, and the OEM local communication system being in electric communication with the ECU. A cellphone is provided having a local communication system disposed therein. The cellphone is in wireless communication with the ECU. The cellphone is adapted to configure the ECU to enable operation of the OEM cameras in response to receipt by the cellphone of an alert signal from the OEM sensors, indicating that an intrusion is in process. The alert signals are representative of detection of a monitored event by one or more of the OEM sensors. In another embodiment aftermarket cameras, sensors or communication systems may be utilized to provide functionality that is unavailable from the vehicle.

A data storage device may be located in the vehicle or remote from the vehicle. The data storage device may communicate with the ECU via the vehicle diagnostic port, or the data storage device may be in wireless communication with the ECU.

The data storage device may wirelessly communicate with the ECU via the OEM satellite communication system or the OEM local communication system.

The cellphone is preferably adapted to direct the communication of information from the cameras to a data storage device, in response to commands entered by a cellphone user. The cellphone commands may direct the communication of information from one or more of the cameras to one or more of a plurality of data storage devices.

The OEM cameras may be disposed of various locations in the vehicle, such as in the front bumper, in one or more of the side view mirrors, or in the rear surface of the vehicle. Other OEM sensors may include door opening sensor, truck opening sensor, a seat occupied sensor, a collision detection sensor, and a global positioning sensor (GPS).

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The following description is presented to enable one of ordinary skill in the art to make and use of the present invention, as provided within the context of a particular application and its requirements. Various modifications to the preferred embodiment will, however, will be apparent to one skilled in the art and the general principles defined herein may be applied to other embodiments. Therefore, the present invention is not intended to be limited to the particular embodiment shown and described herein, but it is to be accorded the widest scope consistent with principles and novel features herein disclosed.

Figure 1:
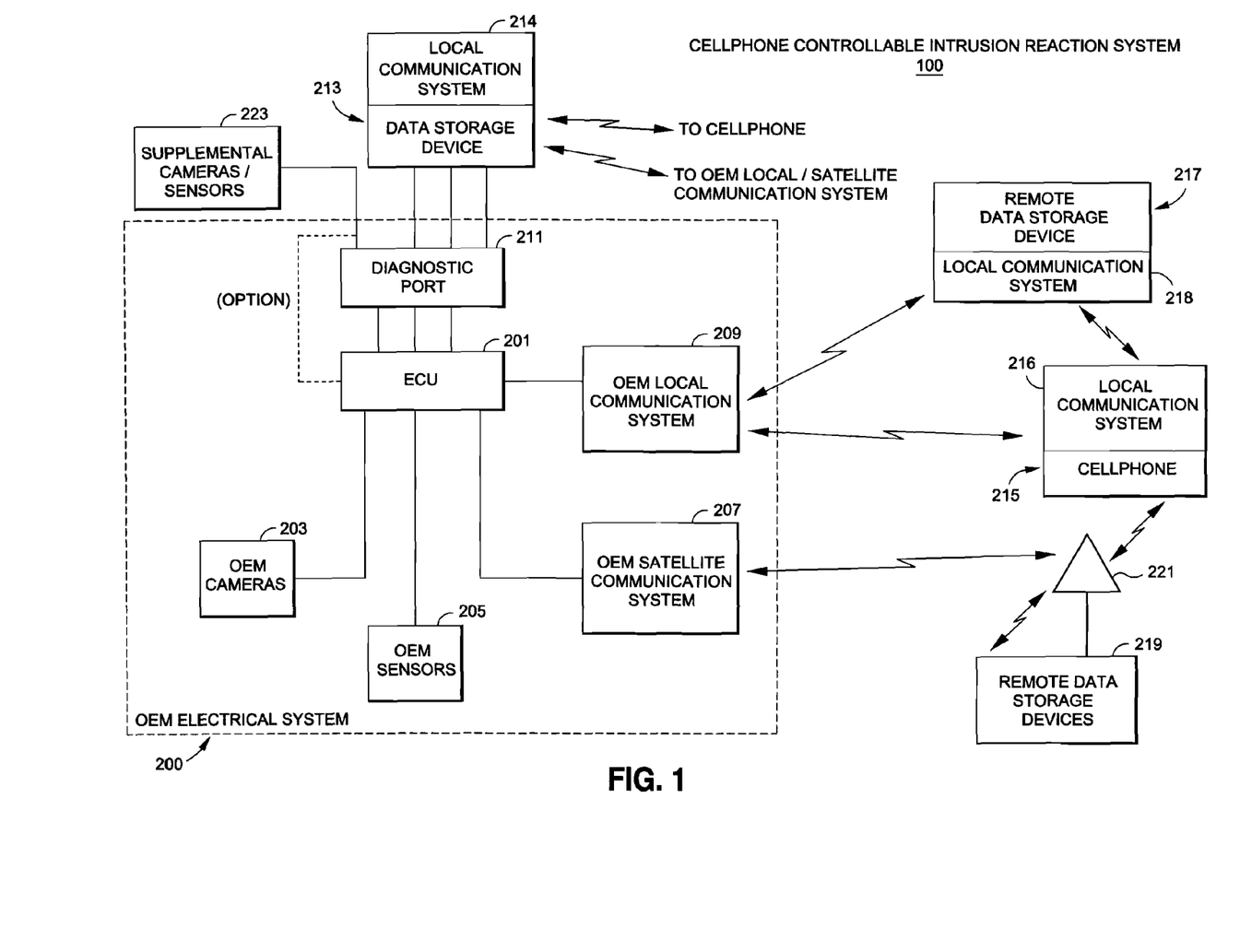
FIG. 1 is a schematic diagram of an exemplary intrusion reaction system in accordance with the one embodiment of the present invention.

FIG. 1 is a block diagram of one embodiment of a cellphone controllable intrusion reaction system. The intrusion reaction system 100 includes OEM system 200, configured to support the functionality of the system as described below.

The OEM system 200 may interface with other resources, to provide an alert signal, indicating detection of a monitored event, and to communicate event related data (live or stored) to a remote location. The event related data may provide information such as the identification of the monitored sensor, the date/time of the detected event, the geographic location of the vehicle, or video data captured by one or more cameras mounted on the exterior or interior of the vehicle.

In some cases, the event related data may be stored within the ECU for later downloading. However, in many cases it is desirable to promptly communicate the detection of a monitored event to the vehicle owner or other designated person, to allow for steps such as notification of police, disabling the vehicle, etc. In such case the monitored event may be communicated through an OEM local communication system or OEM satellite communication system, to a designated cellphone or other remote facility.

Where the event related data exceeds the ECU data storage capacity, such data may be communicated to either a data storage device connected to the vehicle diagnostic port, an on-board data storage device hard wired to the ECU, an on-board data storage device in wireless communication with the OEM local communication system, a cellphone in wireless communication with the OEM local communication system, a cellphone in wireless communication with the OEM satellite communication system, or some other remote storage/controlled facility in wireless communication with the OEM satellite communication system or the cellphone.

Referring to FIG. 1, an exemplary cellphone controllable intrusion reaction system 100 is shown. The system is centered on exemplary vehicle OEM electrical system 200 configured to implement the functions of the present invention. OEM system 200 includes an electric control unit (ECU) 201, in electrical communication with OEM cameras 203, OEM sensors 205, OEM satellite communication system 207, OEM local communication system 209, and diagnostic port 211.

OEM cameras 203 may include cameras mounted at various locations on the vehicle. Front cameras may be installed in the bumper of the vehicle. Side cameras may be installed in the side view minors, and a rear camera may be disposed proximate the rear license plate. OEMs such as BMW include such cameras, at the locations specified, on vehicles such as the 2012 BMW 7 Series model.

OEM sensors 205 may be implemented in a variety of forms. Such sensors commonly include a door opening sensor, a trunk opening sensor, a seat occupied sensor, a collision detection sensor, and a global positioning sensor (GPS). Additional sensors, available on various vehicles, such as the 2012 BMW 7 Series model, include an interior motion detecting sensor and pedestrian/vehicle detection sensors, which may be implemented as infra-red, ultrasonic and/or millimeter wave radar systems. The OEM sensors 205 are configured to detect a triggering event, such as a vehicle intrusion/break-in, an accident or other notable event.

Additional sensors may be added as desired. However, in order to minimize cost and installation efforts, OEM sensors are primarily, if not exclusively used.

When a vehicle break-in or other monitored event occurs, the OEM sensors 205 generate a responsive output signal, which is communicated to the ECU 201. The ECU 201 may respond to the sensor output in various ways. For example, the ECU may generate an output signal indicating the nature of the detected event, which may be communicated to diagnostic port 211, OEM local communication system 209, and/or OEM satellite communication system 207. The ECU 201 may store information representative of the detected event, with date and time information appended thereto. Additionally/alternatively, the ECU 201 may output the information to an on-board data storage unit 213, which may be connected to OEM diagnostic port 211. Additionally/alternatively, the on-board data storage unit 213 may be constructed to include a local communication system, such as Wi-Fi™ or Bluetooth™, which communicates with the ECU 201 via OEM local communication system 209. In this embodiment the on-board data storage unit 213 need not be engaged to the diagnostic port, and can be located discreetly in the vehicle, where it may be less likely to be detected by an intruder.

The OEM local communication system 209 may communicate information from the ECU to cellphone 215, which may also include a local communication system. In yet another embodiment, the cellphone 215 may receive information from the ECU via a local communication system resident in on-board data storage unit 213. Cellphone 215 incorporates an internal memory which may store information and data therein.

Remote data storage device 217 is not an on-board data storage unit, but can communicate with the ECU 201 via associated local communication system 218 or cellphone 215. For that purpose, cellphone 215 may communicate with OEM local communication system 209 by means of associated local communication system 216, or via satellite communication system 207.

Remote data storage device 217 may be located in a garage or other location where it can be in communication with OEM local communication system 209 and/or cellphone 215.

In yet another implementation, information from OEM sensors 205 may be communicated to a remote data storage device 219, via OEM satellite communication system 207 and transceiver 221. The transceiver 221 is representative of a multi-network hub that can communicate with the OEM system 200 via satellite link; can communicate with the cellphone 215 via a cellphone network; and can communicate with remote data storage device 219 via a cellphone network, a landline phone network, and/or the internet, from which the remote data storage device 219 is accessible.

Information/control signals from the remote data storage device 219 may be communicated to the OEM system 200, e.g. to configure the ECU 201 or request other information from OEM system 200, via one or more of OEM satellite communication system 207 and OEM local communication system 209/cellphone 215.

In one embodiment an intrusion event is detected by OEM sensors 205, and communicated to the vehicle owner via OEM local communication system 209 and cellphone 215. The vehicle owner may respond by configuring the ECU to activate and output information from one or more of OEM cameras 203, to be viewed by the vehicle owner on the cellphone display. The video data from the OEM cameras 203 may be also communicated to one or more of on-board data storage unit 213, remote data storage device 217 and remote data storage/control device 219. A service advisor located at remote data storage/control facility 219, or otherwise in communication with facility 219, can also access information from OEM cameras 203 and/or OEM sensors 205, and advise the vehicle owner and/or law enforcement officers of the situation.

As one of ordinary skill will recognize, the preferred data storage location of information may depend in part on the size of the data file. For example, storage of live data from OEM cameras 203 may require more storage space then is available in ECU 201 or cellphone 215. In such case, the video data would likely be stored in on-board data storage unit 213, remote data storage device 217 or remote data storage/control device 219. Similarly, the volume and resolution of data provided from OEM cameras 203 and OEM sensors 205 may necessitate the use of higher speed data transfer systems, which may not be available in certain links, such as links using OEM local communication system 209.

Accordingly, the OEM system 200, and in particular the ECU 201, may be configured to accommodate the operating characteristics and requirements of the OEM cameras 203 and OEM sensors 205, as well as the communication systems and associated devices, such as OEM local communication system 209, OEM satellite communication system 207, and cellphone 215.

It is understood that some of the OEM cameras 203, OEM sensors 205, OEM satellite communication system 207 and OEM local communication system 209 may be powered off when the car is turned off. However, in the event of an intrusion or other event, it is desirable to turn those components on. Therefore, one aspect of the present invention is directed toward providing a power-on signal to dormant OEM systems in response to a detected event when the vehicle is turned off.

When a vehicle is turned off, certain components or systems remain on, at least to a certain extent. For instance, the alarm system remains powered when the vehicle is off to detect a break-in. Therefore, one or more OEM cameras 203 or sensors 205 may be associated with a system which remains at least partially powered when the vehicle is off. When those OEM cameras 203 or sensors 205 detect a break-in or other monitored event, the output signal generated by those OEM cameras 203 or sensors 205 includes a power-on command which causes power to be sent to the other OEM cameras 203 and sensors 205 to deploy all available resources toward capturing the event. In one embodiment, the power-on command is communicated to the ECU, which in turn is programmable to respond to sets of circumstances, e.g. door open, alarm on, car off, by providing power to the dormant OEM cameras 203 and sensors 205 and recording devices.

Alternatively/Additionally application programs installed on cellphone 215 and/or at remote data storage/control facility 219 allow the user to selectively access and configure the ECU and components of OEM system 200, to capture and direct the transmission of data to various locations, such as to a police department or such other locations where the data can be acted upon or stored in secure conditions.

As noted above, the present invention allows for OEM systems to be configured to provide an enhanced intrusion reaction system, beyond the normal functionality of the OEM systems, with little or no additional on-board devices beyond the OEM systems. However, as one skilled in the art will recognize, where the vehicle has a less robust OEM system capacity, supplemental (aftermarket) internal or external cameras/sensors and associated switching circuitry may be provided, which communicates with the ECU 201, and may be monitored and controlled by ECU 201, programmed as described above and/or configured in response to application programs installed on cellphone 215 or in a remote data storage/control facility.

The supplemental cameras/sensors 223 are shown at FIG. 1, in electrical communication with ECU 201 via diagnostic port 211, or optional direct connection to ECU 201. In practice, the supplemental cameras/sensors 223 may be connected to the vehicle electrical control system in various ways other than through diagnostic port 211 or direct connection to ECU 201. Moreover, the inclusion of such supplemental cameras/sensors, while adding to the cost and installation requirements, does not detract from the boarder advantages of the present invention in relation to the configuration of existing OEM sensor components to implement enhanced sensor and communication functionality, including the ability to direct the configured system via applications running in a cellphone or in a remote data storage/control facility, and the related communication network.

In some cases the vehicle may incorporate a robust OEM system capacity, though the ability to reprogram/reconfigure the ECU to implement that capacity may be restricted by the vehicle manufacturer. In such as case, the features of the present invention may be implemented by either the use of supplemental internal or external cameras/sensors, and/or new addition of circuitry for bypassing the ECU and powering the on-board cameras/sensors, etc. in response to a detected event and/or in response to a receipt of a signal generated by an application program running in the supplemental circuitry, on cellphone 215 and/or on a remote storage/control facility.

Figure 2:
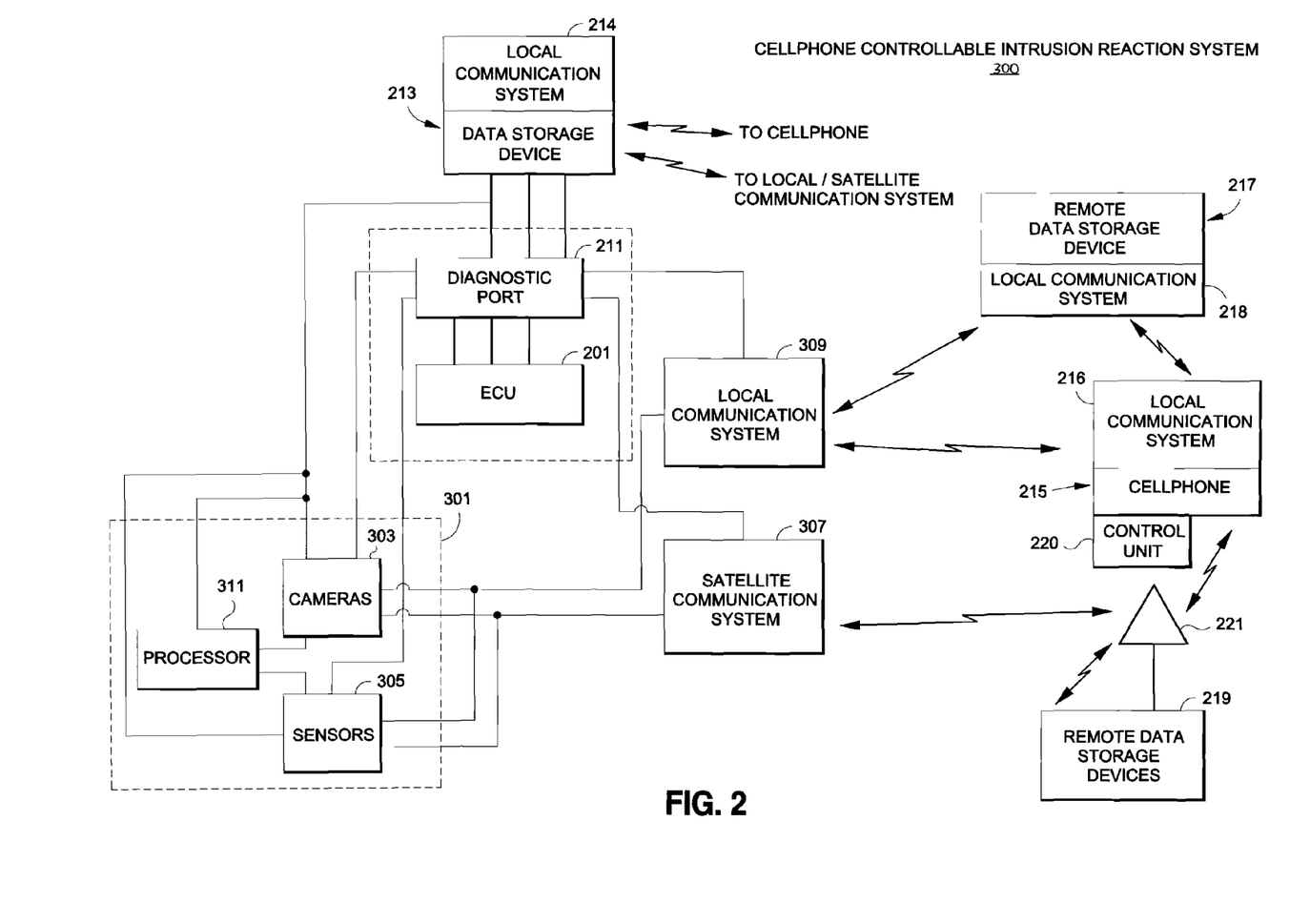
FIG. 2 is a schematic diagram of an exemplary intrusion reaction system in accordance with another embodiment of the present invention.

Referring now specifically to FIG. 2, there is shown another embodiment of the cellphone controllable intrusion reaction system 300 which is suitable for use in relation to less robust vehicle systems, or where the ability to reprogram/reconfigure the ECU is restricted by the vehicle manufacturer. The system 300 minimizes interaction with the ECU 201 and which relies more on aftermarket detection equipment, rather than relying on OEM equipment, as described in the embodiments above. In this regard, it is understood that it may be difficult to configure the ECU 201 to perform certain tasks. Thus, certain embodiments may operate primarily independent of the ECU 201 or may utilize the ECU to merely obtain a "triggering signal" associated with a triggering event to initiate data recording.

The monitoring and recording system shown in FIG. 2 includes a monitoring unit 301 including one or more aftermarket cameras 303 and sensors 305 connected to the vehicle. The cameras 303 may be mounted to the vehicle and may capture images within the vehicle, as well as outside of the vehicle. The camera(s) 303 may include an internal power source, i.e., battery, or alternatively may connect to the vehicle's power source to receive power therefrom. The cameras 303 may be exclusively aftermarket cameras installed on a previously existing vehicle, or alternatively, the vehicle may include a combination of OEM cameras and aftermarket cameras 303. In this embodiment, the aftermarket cameras 303 may supplement the cameras already located on the vehicle to provide enhanced monitoring. The aftermarket cameras 303 may also be configured to operate independent of the vehicle's ECU 201. In this regard, if the vehicle is turned off, the aftermarket cameras 303 may continue to monitor the vehicle, even if the OEM cameras are programmed to turn off when the vehicle is off.

The monitoring and recording unit 301 may also include a data storage unit 213 in communication with the cameras 303 to store the images captured by the cameras 303. The data storage device 213 may be configured to record over old data if no triggering event occurs within a certain period of time. For instance, the data storage device 213 may be configured to store 30 minutes of data, such that if no triggering event has occurred within 30 minutes, the oldest data is recorded over. Other data storage techniques may also be used to store critical data, while deleting or not storing data which does not appear to be critical, based on event detection criteria stored in the ECU. For instance, the data storage device 213 may include a short term storage unit which "buffers" data until a triggering event occurs, at which time the data is transferred to a long term storage unit.

The monitoring and recording system 300 additionally includes a processor 311 in communication with the monitoring unit 301, the data recording device 213 and the vehicle ECU 201. The processor 311 is in communication with the ECU 201 to sense the presence of the triggering event. The triggering event may be detected in several different ways depending on the systems and resources available at any given time. When the vehicle is operational, data from the vehicle's systems and resources may be used to detect a triggering event. For instance, speed, acceleration/deceleration, voltage changes, etc. may be used to detect an accident or other triggering event when the vehicle is operational. However, when the vehicle is parked and turned off, only certain resources may be available for detecting the triggering event. For instance, the vehicle's alarm may remain operational and may include a motion sensor or vibration sensor which may detect intrusion.

In another embodiment, the system 100 may utilize the capabilities of the cellphone 215, rather than the processing capabilities of the processor 311 or ECU 201, to analyze sensor data and control the cameras 303 and data storage devices 213, 217. In this regard, the cellphone 215 may include a control unit 220 having operating criteria stored thereon, wherein the operating criteria relates to conditions which would initiate operation of the cameras 303 and the data storage devices 213, 217. For instance, if the cellphone 215 receives sensor data indicative of a window broken on the vehicle, the control unit 220 may generate a startup signal which is communicated to the cameras 303 and data storage devices 213, 217 to capture and store images.

Figure 3:
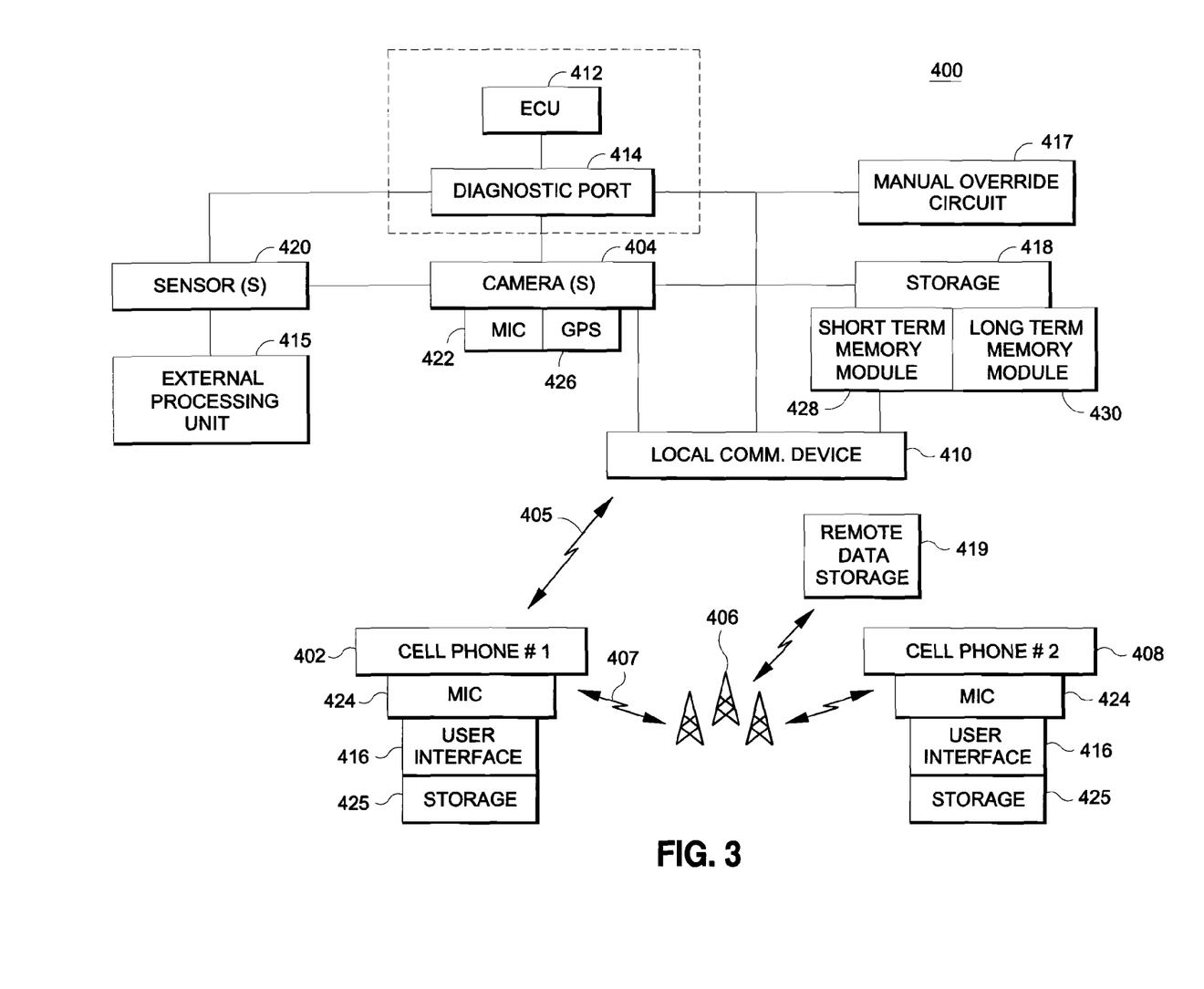
FIG. 3 is a schematic diagram of an exemplary vehicle monitoring and data relay system including a camera and a cellphone.

Referring now specifically to FIG. 3, there is shown another embodiment of the present invention which is directed toward a monitoring system 400 which utilizes a cellphone 402 to relay data corresponding to images captured by a camera 404 mounted in the vehicle to a remote location via the cellular communication network 406. In this regard, the images captured by the camera 404 may be uploaded to another cellphone 408, a website, a remote database, or some other remote destination known by those skilled in the art. Thus, the camera 404 does not require a built-in capacity to independently communicate the images to a remote location. Rather, the system 400 may utilize the existing capabilities of the user's cellphone 402 to effectuate long-range communication of the images.

The monitoring system 400 may advantageously allow a parent to remotely monitor a teenage child who is new to driving. The camera 404 may capture still shots or videos of the vehicle, the surroundings, and/or the teenage driver. The captured images may be wirelessly communicated from the camera 404 to the parent's cellphone 408 (i.e., remote cellphone #2) using the long-range communication capabilities of the teenager's cellphone 402 located in the vehicle. Various aspects of the present invention allow the monitoring system 400 to operate independent of any input from the teenage driver. In this regard, images may be captured and uploaded without distracting the teenage driver from concentrating on the road. As will be explained in more detail below, the image data captured by the camera 404 may be stored in a storage device, either locally (i.e., in physical proximity to the camera) or remotely (i.e., online storage), and selectively retrieved by the parent as desired, either in real time or at a later time, to monitor the child's driving. The system 400 may also be used to communicate signals from the parent's cellphone 408 to the vehicle ECU 412 to control the vehicle (i.e., to prevent the vehicle from being turned ON) or to the child's cellphone 402 to send a text communication to the child based on information received by the parent (i.e., images, position information, etc.)

The monitoring system 400 may also be used to protect the driver of the vehicle from liability as a useful tool in establishing the driver's innocence. For instance, it is common in some cultures for a "feigned pedestrian" to throw himself toward a moving vehicle in an attempt to obtain a monetary award from the driver. The monitoring system 400 may be used to capture the actions of the feigned pedestrian to expose the true intent of the feigned pedestrian and exonerate the driver.

The camera 404 utilized in the monitoring system 400 may be an OEM camera built into the vehicle or alternatively, an aftermarket camera. The camera 404 is mounted on the vehicle to capture images related to the vehicle. As used herein, the word "images" may refer to a snapshot or picture, as well as video content. Along these lines, the camera 404 may be configured to capture various types of images, including still images or video images. The camera 404 may be mounted on the vehicle (either inside or outside of the vehicle) to capture images within a monitoring zone, which may include of the inside of the vehicle, the outside of the vehicle, and/or the areas surrounding the vehicle. For instance, the camera 404 may be mounted and aimed through the windshield to capture images of the area in front of the vehicle, or aimed through other windows to capture images on the side or behind the vehicle. The camera 404 may be used to monitor the surrounding area of the vehicle when the vehicle is parked to capture attempted intrusions into the vehicle, or the camera 404 may be employed when the vehicle is moving to capture images of surrounding vehicles, pedestrians, bicyclists, etc., in adjacent lanes or areas.

It is contemplated that any number of cameras 404 may be used in the monitoring system 400, including a single camera 404 or a plurality of cameras 404. When a plurality of cameras 404 is used, the cameras 404 may be in communication with a single local communication device 410, as will be described in more detail below. Furthermore, the cameras 404 are preferably in electrical communication with the vehicle ECU 412 via the vehicle's diagnostic port 414 to receive power from the vehicle, even when the vehicle is in an OFF state. It is also contemplated that the cameras 404 may include an internal power source to allow for operation independent of the ECU 412.

The camera 404 is in electrical communication with a local communication device 410 which is configured to locally transmit a signal, preferably a wireless signal, corresponding to the images captured by the camera 404. The local signal is received by the cellphone 402, and therefore, the local communication device 410 effectuates communication between the camera 404 and the cellphone 402. It is contemplated that the local communication device 410 may be capable of establishing bi-directional communication between the cellphone 402 and the camera 404. In this regard, images may be transferred from the camera 404 to the cellphone 402, and command signals may be transferred from the cellphone 402 to the camera 404. As noted above, the communication between the local communication device 410 and the cellphone 402 is preferably wireless communication, such that a signal may be communicated wirelessly between the camera 404 and the cellphone 402. However, it is also contemplated that other embodiments may include wired communication between the local communication device 410 and the cellphone 402. For instance, one implementation may include the cellular capabilities (i.e., the cellphone 402) built-in to the local communication device 410.

According to one embodiment, the system 400 employs a two-stage wireless communication pathway, wherein the a first wireless communication pathway 405 extends between the local communication device 410 and the cellphone 402, and a second communication pathway 407 extends between the cellphone 402 and the cellular telephone network 406. In this regard, the system 400 utilizes the capabilities of the driver's cellphone 402 to relay the image data, rather than requiring the local communication device 410 to communicate directly with the cellular telephone network 406.

The local communication device 410 may be an add-on to the camera 404, such as a plug-connectable accessory connectable to a USB port or similar port on the camera 404. Alternatively, the local communication device 410 may be built-in to the camera 404. The local communication device 410 may utilize various short range communication protocols, including Bluetooth™, infrared, Wi-Fi™, or other communication protocols known by those skilled in the art.

The local communication device 410 may also be connectable to the vehicle ECU 412 to receive power and/or data therefrom. The data received from the ECU 412 may be correlated or synchronized with the sensor data and/or camera data. Thus, real-time vehicle information may be synchronized with images obtained from the camera or data detected from the sensors. The synchronization of the data with the image and/or sensor information may paint a clear story of an automotive condition, an accident, or other noteworthy event. For instance, if the vehicle breaks-down, the cameras may capture images of physical symptoms, such as a smoke, which may be synchronized with diagnostic information from the ECU 412. The cameras may also be able to capture audio information which may also be helpful in diagnosing the problem. The captured images, sounds and diagnostic information may be communicated to a remote vehicle diagnostic service center via the cellphone 402 to obtain a vehicle diagnosis. The vehicle diagnosis may be communicated from the diagnostic service center directly to the user's cellphone 402. Thus, the system 400 may allow for quick and objective diagnostic analysis, even in remote locations, such as during a road-trip through the middle of the desert.

The synchronized information may also be useful in to assist in a forensic analysis of an accident, including but not limited to the case of the feigned pedestrian noted above. For instance, the information from the ECU 412 may show the vehicle's speed and acceleration/deceleration in the moments leading up to the accident, and provide a visual record of the vehicle interior and/or surrounding area at the time of the event.

Synchronizing sensor data and camera data may be useful in a variety of other circumstances. For example, many contemporary vehicles incorporate proximity sensors to indicate when a vehicle or other obstacle is closely approaching another vehicle. In accordance with the present invention, the proximity sensors may generate a warning or start up signal which may be used to activate visual sensors, synchronized with the diagnostic sensors showing whether a car is moving at the time of an accident, the condition of the oncoming vehicle immediately prior to the accident and other factors that may assist in a forensic analysis of the damage to both vehicles, and culpability of one or both drivers in relation to the accident.

Synchronization of the sensor data and the camera data is also expected to be useful in relation the control and operation of remotely piloted vehicles, or autonomously operated vehicles, i.e. driverless vehicles that navigate based upon a combination of GPS mapping information and sensor information. Information captured by cameras, inferred sensors, etc., may assist in such navigation and/or may provide a visual record to assist in the development and evaluation of such navigation system.

The cellphone 402 is capable of displaying images received from the camera 404 on a user interface 416, such as a touch-screen display. The cellphone 402 may be used by a driver as a safety tool to provide a field of view in hard-to-see locations, such as blind spots or behind the vehicle. When used in this capacity, the display on the cellphone 402 may be analogous to a built in rear-view display.

The monitoring system 400 may include a storage device 418 similar to the storage device 213 as discussed above. The storage device 418 is in communication with the camera 404 for storing the data corresponding to the images captured by the camera 404. The storage device 418 may also be in communication with the local communication device 410 to allow for transfer of data stored on the storage device 418 to the cellphone 402. The data stored on the storage device 418 may be organized and indexed to allow a user to quickly view a summary of the data stored on the storage device 418 and allow for selective download to the cellphone 402 of the desired data. In this regard, local communication device 410 may allow for bi-directional communication between the cellphone 402 and the storage device 418.

A remote storage device 419 may also be used to store data remotely. Data may be uploaded to the remote storage device 419 regularly or streamed continuously to preserve the data on a long-term basis. For instance, if the vehicle is in an accident, the local storage device 418 may be destroyed; however, a user may retrieve previously stored data from the remote storage device 419. The remote storage device 419 may additionally prevent unwanted tampering with the images. Referring back to the case of the teenage driver, the remote storage device 419 may prevent the teenager from deleting images/data which the teenager does not want the parent to see.

The storage devices may buffer data in a short term memory module 428 for a prescribed buffering period and transition the data to a long term memory module 430 if long term storage of the data is desired. The transition of data from the short term module 428 to the long term module 430 may be automatic in response to receipt of a storage signal, indicative of a certain event or command. As will be described in more detail below, the data transition may occur in response to a verbal command by the driver, as may be the case in the event the driver encounters a feigned pedestrian, as noted above. The data transition may also occur in response to a command sent from the local cellphone 402 or the remote cellphone 408, such as the parent's cellphone when the parent wants to preserve data related to the teenage driver.

Under normal operating conditions, if the data was buffered into the short term memory module and not transitioned to the long term memory module within the buffering period, the data within the short term memory module may be deleted or recorded over with new data. The duration of the buffering period may vary from one embodiment to the next. For instance, in one embodiment, the buffering period may be 15 seconds, while in another embodiment, the buffering period may be several hours.

According to one aspect of the invention, the system 400 includes a manual override circuit 417 which allows a user to prevent data from being deleted or recorded over. The manual override circuit 417 may be actuated via a button on the storage device 418, a button on the camera 404, or via an input on the local cellphone 402 or remote cellphone 408. When the manual override circuit 417 is actuated, the data captured by the camera 404 is stored in the long term storage module to prevent deletion or recording over, which may otherwise occur in normal buffering procedures.

According to one embodiment, the storage device 418 may also be connectable to the vehicle ECU 412 to receive power and/or data therefrom. The data received from the ECU 412 may be correlated or synchronized with the sensor data and/or camera data. Thus, real-time vehicle information may be synchronized with images obtained from the camera or data detected from the sensors. All of the data received by the storage device 418 may be time stamped to indicate when the data was generated and/or received to allow for easy synchronization and comparison of camera data, sensor data, or ECU data.

The monitoring system 400 may include one or more sensors 420 in communication with the camera 404 to detect a triggering event which may initiate several different functions, including but not limited to capturing of images by the camera 404, downloading of data to the storage device 418, and/or uploading of data to the cellphone 402. In this regard, the camera 404 may be configured to initiate image capture in response to receipt of a triggering signal sent by one or more of the sensors 420. The sensors 420 may include OEM sensors, similar to the OEM sensors 205 as discussed above, or aftermarket sensors. The OEM sensors may be in communication with the ECU 412, and thus, the camera may receive a signal from the ECU 412 to generate and transmit an image.

In one embodiment, the sensor 420 detects an event and a triggering signal is generated in response to the detected event. According to one implementation, the sensor(s) are in electrical communication with a processing unit, which may include the ECU 412 or an external processing unit 415, which has event detection criteria stored thereon. The event detection criteria may relate to certain conditions or thresholds which correspond to a triggering event. For instance, the event detection criteria may relate to vehicle speed, vehicle acceleration, vehicle position, vehicle transmission status, the position of external objects relative to the vehicle, changes in passenger seating, etc. In this regard, some sensors 420 may communicate directly with the ECU 412 and the sensor data may be compared with event detection criteria stored on the ECU 412, which generates a triggering signal when the sensor data meets a prescribed event detection condition or passes an event detection threshold. In some cases, the sensors 420 may not communicate with the ECU 412, such as aftermarket sensors 420, and thus, the sensor data generated by such sensors may be analyzed by the external processing unit 415, which generates the triggering signal in response to the sensor data meeting an event detection condition or passing an event detection threshold. Although the exemplary embodiment includes an ECU 412 as well as an external processing unit 415, it is contemplated that other embodiments may include an ECU 412 without an external processing unit 415, or an external processing unit 415 without an ECU 412 (such as older vehicles which predate sophisticated, onboard ECU's).

The following discussion provides several examples of categories of information which the sensors 420 may detect. Those skilled in the art will readily appreciate that the examples provided below are intended to be illustrative in nature only, and are not intended to the limit the spirit and scope of the present invention. Along these lines, other sensors known by those skilled in the art may also be used in connection with other embodiments of the present invention.

According to one embodiment, the sensor 420 detects when the vehicle shifts from one transmission position (i.e., PARK, DRIVE, REVERSE, NEUTRAL), to another transmission position. Therefore, if the vehicle is placed in PARK, the sensor 420 may generate a triggering signal to the camera 420 to capture an image of the vehicle or the surrounding area. This information may be helpful to allow a user to return to his vehicle in a crowded parking lot by using a landmark captured in the image.

In another embodiment, the sensor 420 detects the speed of the vehicle and generates a triggering signal when the vehicle passes a prescribed speed threshold. For instance, the speed threshold may be set at 65 MPH such that a triggering signal is generated anytime the vehicle speed crosses 65 MPH (i.e., regardless of whether the speed is increasing or decreasing). The speed threshold may be set at any speed desired by the user.

The sensor 420 may also detect acceleration/deceleration and generate a triggering signal whenever the acceleration/deceleration exceeds a prescribed threshold. Oftentimes, vehicles experience rapid changes in acceleration/deceleration just before an accident. Thus, by generating the triggering signal in response to a rapid change in acceleration/deceleration, the camera may document the moments leading up to and during an accident. The camera 404 and/or storage device 418 may buffer the data to allow for storage of images happening prior to the triggering event.

According to another embodiment, the camera 404 may be configured to capture an image in response to receipt of a verbal command. In the embodiment depicted in FIG. 3, the camera 404 and cellphone 402 both include microphones 422, 424 which may detect the verbal command. If the command is detected by the cellphone 402, the cellphone must then generate a command signal which is relayed to the camera 404.

In one embodiment, the camera 404 may be programmed to generate and transmit a signal automatically after a prescribed period of time. For instance, the camera 404 may capture an image every 5 minutes, or some other time interval as determined by one skilled in the art. The time interval may be consistent, or may vary as desired.

The camera 404 may further be configured to capture images in accordance with a pre-programmed schedule. For instance, the schedule may require the camera 404 to capture an image at certain times throughout the day. The pre-programmed schedule may additionally include a combination of triggering event(s) and timing sequences. For example, once a triggering event occurs, the camera 404 may capture an image at a predetermined frequency.

In another embodiment, the camera 402 may receive a request from one of the cellphones 402, 408 to capture an image, and communicate the captured image to one or both of the cellphones 402, 408. The request may be communicated from the requesting cellphone 402, 408 in response to manual input by the cellphone's user. For instance, the user of cellphone #2 408 may request an image by sending a request signal to cellphone #1 402 via the cellular telephone network 406. Cellphone #1 402 in turn generates a request signal which is communicated to the camera 404 via the local communication device 10. The image captured by the camera 404 is routed all the way back to cellphone #2 408 via the local communication device 410 and cellphone #1 402.

The system 400 may include a GPS module 426 for including GPS information with the data corresponding to the captured images. In the exemplary embodiment, the GPS module 426 is coupled to the camera 404, although it may be coupled to other components without departing from the spirit and scope of the present invention.

According to one embodiment of the present invention, the system 400 may be configured to operate autonomously without any input from a user. In this regard, the cellphone 402 and camera(s) 404 may include respective autonomous operations circuits which allow the system to operate independent of a user. The camera autonomous operation circuit may be configured to automatically obtain images in response to a predetermined image capture schedule or in response to receipt of a command from the sensor(s) 420. The cellphone autonomous operation circuit may be configured to automatically relay data received from the camera 404 to the cellular telephone network 406.

Another aspect of the present invention is related to capturing images and relaying those images to a remote cellphone 408 (such as the cellphone belonging to the vehicle's owner) in response to a detected event. Along these lines, the sensors 420 may detect the triggering event, such as a break-in or accident and configure the camera(s) 404 to capture images related to the triggering event. The sensors 420 may also configure the storage device(s) 418, 419 to store the data from a moment in time prior to the triggering event, to a moment in time following the triggering event. For example, data that is buffered may be stored in a long term memory to capture the entirety of the triggering event, from beginning to end, including the moments leading up the triggering event and the moments following the triggering event. The local communication device 410 may communicate a signal to the remote cellphone 408 via a local cellphone 402, wherein the signal includes a message, as well as images related to the triggering event. For instance, in the case of a teenage driver, if the vehicle is involved in an accident, the system 400 may be programmed to detect the accident, capture images before/during/after the accident, and send a text message/email to the parent indicating that the vehicle has been in an accident, wherein the message additionally includes pictures of the vehicle/accident. This feature may also be useful to alert a vehicle owner of a vehicle break-in immediately after the break-in occurs. Therefore, if the vehicle owner is in close proximity to the vehicle (such as in a mall and the vehicle is in the mall parking lot), the owner can quickly go to the vehicle to quickly assess the situation.

It is additionally contemplated that the system 400 may be used to allow the remote cellphone 408 to send communications to the local cellphone 402 in response to images or data received by the remote cellphone 408. For instance, referring back to the scenario of the teenage driver, if the GPS data indicates that the driver has deviated from a preset driving route, the parent's remote cellphone 408 may automatically send a text message, email or other message to the teenager's cellphone 402 to instruct the teenager to return to the desired route. Other examples of when the remote cellphone 408 may communicate with the local cellphone 402 is when the vehicle's speed or acceleration passes a preset threshold, when the vehicle is operating outside of a preset allowable operating time, or when the vehicle has too many or too few passengers in the vehicle. It is also contemplated that the system 400 may allow for at least partial control of the vehicle from the remote cellphone 408. Along these lines, if any of the foregoing conditions are met (i.e., the vehicle deviating from a preset route), the remote cellphone 408 may transmit a signal to the vehicle's ECU 412 via the communication pathway of the system 400 (i.e., from the remote cellphone 408 to the ECU 412 via the cellular telephone network 406, the local cellphone 402 and the local communication device 410). In response to receiving the signal, the ECU 412 may display a message on a dashboard display, may flicker the lights within the vehicle, or cause an audible alert to be emitted through the audio system in the vehicle. The ECU 412 may also be programmed to prevent the vehicle from being turned on to prevent further driving (once the vehicle has been safely turned off). Therefore, the monitoring and communication capability of the system 400 provides a parent of a teenage driver with a greater degree of control and ability to interface with a teenage driver.

It is also contemplated that the monitoring system 400 may raise privacy concerns related to the driver, such as information pertaining to the driver's location, driving conditions (i.e., speed, acceleration, etc.), the identify of passengers in the vehicle, etc. Therefore, the system 400 may be organized to allow the owner of the system 400 to set up safeguards to protect the privacy of the information gathered by the system 400. For instance, the system 400 may include a deletion circuit to allow any images or related data to be deleted from the storage devices 418, 419. It is also contemplated that the data stored in the storage devices 418, 419 may be stored on removable disks which would allow the data to be physically destroyed. The storage devices 418, 419 may also be configured to allow the data to be shielded via password protection.

The storage devices 418, 419 may also organize or format the data differently based on the cellphone communicating directly with the local communication device 410. In this regard, each cellphone 402, 404 may include a unique identifier which is received by the storage devices 418, 419 to format the data. For instance, in the case of the teenage driver mentioned above, if the teenage driver's cellphone is communicating directly with the local communication device 410, then the data may be stored on the storage devices 418, 419 according to a first set of storage parameters. However, if the parent's cellphone is communicating directly with the local communication device 410, then the data may be stored on the storage devices 418, 419 according to a second set of storage parameters.

For instance, when the teenager's cellphone is communicating with the local communication device 410, that is an indication that the teenager is driving, and all data captured during the teenager's driving session may be viewed by a wide range of individuals, i.e., the parents, the teenager, the teenager's driver's ed. instructor, etc. However, when one of the parents' cellphones is communicating with the local communication device 410, that is an indication that a parent is driving, and the parent may want more restricted access to the data captured during the parent's driving session (i.e., reviewed only by that parent). For instance, the storage devices 418, 419 may only release data related to the parent's driving session on the parent's cellphone and/or after proper password entry. Along these lines, various embodiments of the present invention may centralize the storage to local storage 425 on one or both of the cellphones 402, 408 as a way of restricting access to the information and mitigating unwanted dissemination of the data.

What is claimed is:

1. A cellphone controllable vehicle monitoring system for use with a vehicle having a vehicle ECU, a vehicle interior, and vehicle exterior, the system comprising:
    an electrical monitoring system including a plurality of cameras and a plurality of sensors, the plurality of cameras being configured to capture images within a zone including the vehicle interior, the vehicle exterior, and an area surrounding the vehicle, the plurality of sensors being able to detect a monitoring event and generate a monitoring signal in response thereto;
    a storage device in communication with the plurality of cameras and configured to store the images captured by the plurality of cameras wherein the data storage unit includes a short term memory module and a long term memory module, the data storage unit being configured to buffer data in the short term memory module for a prescribed buffering period and to transition the buffered data to the long term memory module in response to receipt of a storage signal indicative of a triggering event or command;
    a local monitoring communication system in communication with the plurality of cameras and sensors and configured to transmit an alert signal in response to receipt of the monitoring signal; and
    a cellphone in wireless communication with the local monitoring communication system, the cellphone having:
        a local cellphone communication system disposed therein; and
        a control unit configured to generate a startup signal when the alert signal matches operating criteria stored on the cellphone;
        the startup signal being communicated to the plurality of cameras via the local monitoring communication system to initiate operation of the plurality of cameras.

2. The monitoring system as recited in claim 1, wherein the plurality of sensors includes at least one from the group comprising: motion sensors, sound sensors, brightness sensors, and vibration sensors.

3. The monitoring system as recited in claim 1, wherein the plurality of cameras are configured to capture images at programmable time intervals.

4. The monitoring system as recited in claim 1, wherein the plurality of cameras and plurality of sensors are OEM devices.

5. The monitoring system as recited in claim 1, wherein the plurality of cameras and plurality of sensors are aftermarket devices.

6. The monitoring system as recited in claim 1, wherein the storage device is in wired communication with the plurality of cameras.

7. The monitoring system as recited in claim 1, wherein the storage device is in wireless communication with the plurality of cameras.

8. The monitoring system as recited in claim 1, wherein the local monitoring communication system is in communication with the storage device to facilitate communication between the storage device and the cellphone.

9. The monitoring system as recited in claim 1, wherein the sensors are programmable by the cellphone to generate the monitoring signal in response to user defined triggering criteria.

10. The monitoring system as recited in claim 1, wherein the storage device is connectable to the vehicle ECU to receive power and data therefrom, the storage device being configured to correlate the monitoring event with real-time data from the vehicle ECU.

11. The monitoring system as recited in claim 1, wherein the short term module is configured to automatically delete data therefrom after the data resides thereon for a period of time equal to the buffering period.

12. The monitoring system as recited in claim 1, wherein establishing buffered data in the short term memory module is transitioned to the long term memory module when the vehicle is involved in an accident, to establish a record to mitigate a driver's liability in the accident.

* * * * *

UNITED STATES PATENT AND TRADEMARK OFFICE
CERTIFICATE OF CORRECTION

PATENT NO. : 8,855,621 B2
APPLICATION NO. : 13/688641
DATED : October 7, 2014
INVENTOR(S) : Ieon Chen Page 1 of 1

It is certified that error appears in the above-identified patent and that said Letters Patent is hereby corrected as shown below:

In the Specification

Column 5, Line 31, "unit" should be --device--

Column 5, Line 43, "unit" should be --device--

Column 7, Line 28, "unit" should be --device--

In the Claims

Column 15, Claim 1, Line 11, "a storage device" should be --a data storage device--

Column 15, Claim 1, Line 13, "unit" should be --device--

Column 15, Claim 1, Line 15, "unit" should be --device--

Column 16, Claim 6, Line 2, "storage device" should be --data storage device--

Column 16, Claim 7, Line 2, "storage device" should be --data storage device--

Column 16, Claim 8, Line 3, "storage device" should be --data storage device--

Column 16, Claim 8, Line 4, "storage device" should be --data storage device--

Column 16, Claim 10, Line 2, "storage device" should be --data storage device--

Column 16, Claim 10, Line 3, "storage device" should be --data storage device--

Signed and Sealed this
Sixth Day of August, 2019

Andrei Iancu
*Director of the United States Patent and Trademark Office*